US008625431B2

(12) United States Patent
Droux et al.

(10) Patent No.: US 8,625,431 B2
(45) Date of Patent: *Jan. 7, 2014

(54) NOTIFYING NETWORK APPLICATIONS OF RECEIVE OVERFLOW CONDITIONS

(75) Inventors: Nicolas G. Droux, Rio Rancho, NM (US); Kais Belgaied, Sunnyvale, CA (US); Sunay Tripathi, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/226,535

(22) Filed: Sep. 7, 2011

(65) Prior Publication Data

US 2012/0026885 A1 Feb. 2, 2012

Related U.S. Application Data

(63) Continuation of application No. 11/490,821, filed on Jul. 20, 2006, now Pat. No. 8,036,127.

(51) Int. Cl.
*G06F 11/00* (2006.01)

(52) U.S. Cl.
USPC ........... 370/236; 370/235; 370/230; 370/231; 370/241.1; 370/242

(58) Field of Classification Search
USPC .............. 370/235, 229, 231, 236, 241, 241.1, 370/242; 709/235
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,732,182 B1 * | 5/2004 | Beverly, IV | 709/230 |
| 6,757,731 B1 | 6/2004 | Barnes et al. | |
| 6,831,893 B1 | 12/2004 | Ben Nun et al. | |
| 6,839,748 B1 * | 1/2005 | Allavarpu et al. | 709/223 |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |

(Continued)

OTHER PUBLICATIONS

Dovrolis, C., Thayer, B. And Ramanathan, P: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Omer Mian
(74) *Attorney, Agent, or Firm* — Osha Liang LLP

(57) ABSTRACT

A method for notifying a packet destination that includes receiving a packet by a network interface card (NIC), where the packet destination is a destination of the packet, classifying the packet, forwarding the packet to one of a plurality of receive rings on the NIC, determining whether the one of the plurality of receive rings comprises space to store the packet, dropping the packet if the receive ring does not comprise the space to store the packet, and sending a notification message to the packet destination, where the notification message indicates that the packet was dropped by the receive ring.

14 Claims, 9 Drawing Sheets

(56) References Cited

U.S. PATENT DOCUMENTS

| | | |
|---|---|---|
| 7,260,102 B2 | 8/2007 | Mehrvar et al. |
| 7,313,142 B2 | 12/2007 | Matsuo et al. |
| 2003/0037154 A1 | 2/2003 | Poggio et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0070066 A1 | 3/2006 | Grobman |
| 2006/0140578 A1* | 6/2006 | Ohnishi .......................... 386/47 |
| 2006/0174324 A1 | 8/2006 | Zur et al. |
| 2006/0182031 A1* | 8/2006 | Tran .............................. 370/235 |

OTHER PUBLICATIONS

"Solaris Networking—The Magic Revealed"; Sunay Tripathi's Solaris Networking Weblog; Nov. 14, 2005, pp. 1-22 (22 pages).

* cited by examiner

NOTIFYING NETWORK APPLICATIONS OF RECEIVE OVERFLOW CONDITIONS

CROSS-REFERENCE TO RELATED APPLICATIONS

This application is a continuation of U.S. patent application Ser. No. 11/490,821, filed on Jul. 20, 2006, and assigned to assignee of the present application. This application claims benefit of U.S. patent application Ser. No. 11/490,821 under 35 U.S.C. §120. U.S. patent application Ser. No. 11/490,821 is hereby incorporated in its entirety.

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for notifying a packet destination. The method comprises receiving a packet by a network interface card (NIC), wherein the packet destination is a destination of the packet, classifying the packet, forwarding the packet to one of a plurality of receive rings on the NIC, determining whether the one of the plurality of receive rings comprises space to store the packet, dropping the packet if the receive ring does not comprise the space to store the packet, and sending a notification message to the packet destination, wherein the notification message indicates that the packet was dropped by the receive ring.

In general, in one aspect, the invention relates to a method for notifying a packet destination. The method comprises receiving a packet at a level in a networking path, wherein the level in the networking path comprises one selected from a group consisting of a receive ring, a virtual network interface card (VNIC), an Internet Protocol (IP) layer and a transport layer, determining whether the level can store the packet, dropping the packet if the level cannot store the packet, and sending a notification message to the packet destination, wherein the notification message indicates that the packet was dropped by the level, wherein the networking path is associated with the packet destination.

In general, in one aspect, the invention relates to a system. The system comprises a network interface card (NIC), comprising a plurality of receive rings, a hardware classifier, wherein the NIC is configured to: receive a packet by a network interface card (NIC), wherein a packet destination is a destination of the packet, classify the packet by the hardware classifier, forward the packet to one of the plurality of receive rings, determine whether the one of the plurality of receive rings comprises space to store the packet, drop the packet if the receive ring does not comprise space to store the packet, and send a notification message to the packet destination, wherein the notification message indicates that the packet was dropped by the receive ring, and a host, operatively connected to the NIC, comprising the packet destination, wherein the host is configured to forward the notification message to the packet destination.

Other aspects of the invention will be apparent from the following description and the appended claims.

DETAILED DESCRIPTION

Figure 1:
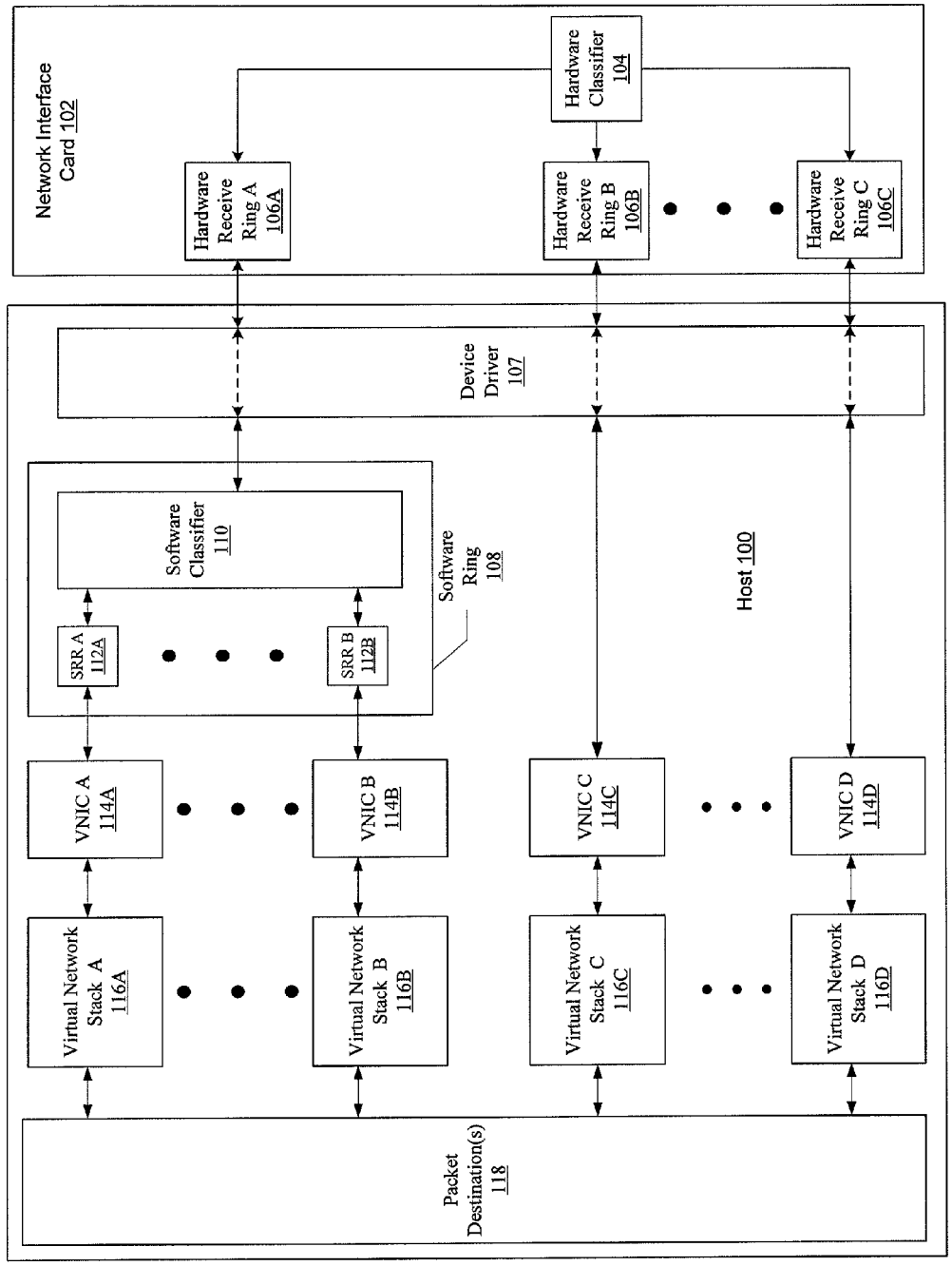
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for notifying an application that packets destined for the application have been dropped. More specifically, in one or more embodiments of the invention, the application may register to receive notification messages from one or more levels in a networking path (e.g., receive ring, virtual network interface card (VNIC), Internet Protocol (IP) layer, transport layer) associated with the application. Further, the application may register to obtain information about dropped packets associated with a specific connection or socket.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network) (not shown). For example, the NI may correspond to an RJ-45 connector, a wireless antenna, etc. The packets received by the NI are then sent to other components on the NIC (102) for processing. In one embodiment of the invention, the NIC (102) includes a hardware classifier (104) and one or more hardware receive rings (HRRs) (106A, 106B, 106C). In one embodiment of the invention, the HRRs (106A, 106B, 106C) correspond to portions of memory within the NIC (102) used to temporarily store the received packets.

In one embodiment of the invention, the hardware classifier (104) is configured to analyze the incoming network traffic, typically in the form of packets, received from the network (not shown). The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the hardware classifier (104) is configured to classify packets using one or more of the follow criteria: (i) source Media Access Control (MAC) address, (ii) destination MAC address, (iii) source Internet Protocol (IP) address, (iv) destination IP address, (v) source port number, (vi) destination port number, (vii) protocol-type (e.g., TCP, UDP, etc.). In one embodiment of the invention, the aforementioned classification criteria are obtained from the header of the packet. Said another way, the hardware classifier (104) uses the header of the packet to classify the packet.

In one embodiment of the invention, the host (100) may include the following components: a device driver (107), a software ring (108), one or more virtual network interface cards (VNICs) (114A, 114B, 114C, 114D), one or more virtual network stacks (VNSs) (116A, 116B, 116C, 116D), and one or more packet destinations (118). Each of the aforementioned components is described below.

In one embodiment of the invention, the device driver (107) provides an interface between the HRRs (106A, 106B, 106C) and the host (100). More specifically, the device driver (107) exposes the HRRs (106A, 106B, 106C) to the host (100) such that the host (100) (or, more specifically, a process executing in the host (100)) may obtain packets from the HRRs (106A, 106B, 106C).

In one embodiment of the invention, the software ring (108) includes a software classifier (110) and a number of software receive rings (SRR) (e.g., SRR A (112A), SRR B (112B)). In one embodiment of the invention, the software classifier (110) has the same functionality as the hardware classifier (104). However, instead of sending the classified packets to a HRR (106A, 106B, 106C), the software classifier (110) forwards classified packets to one of the SRRs (112A, 112B). The SRRs (112A, 112B) are configured to temporarily store the received packets after being classified by the software classifier (110). In one embodiment of the invention, the software ring (108) resides in a Media Access Control (MAC) layer (not shown) of the host (100).

In one embodiment of the invention, each of the virtual network interface cards (VNICs) (114A, 114B, 114C, 114D) is associated with either a SRR (112A, 112B) or a HRR (106A, 106B, 106C). The VNICs (114A, 114B, 114C, 114D) provide an abstraction layer between the NIC (102) and the various packet destinations (118) executing on the host (100). More specifically, each VNIC (114A, 114B, 114C, 114D) operates like a NIC (100). For example, in one embodiment of the invention, each VNIC (114A, 114B, 114C, 114D) is associated with one or more Internet Protocol (IP) addresses, one or more Media Access Control (MAC) address, optionally, one or more ports, and, is optionally configured to handle one or more protocol types. Thus, while the host (100) may be operatively connected to a single NIC (102), packet destinations (118) executing on the host (100) operate as if the host (100) is bound to multiple NICs. In one embodiment of the invention, the VNICs (114A, 114B, 114C, 114D) reside in a Media Access Control (MAC) layer of the host (100).

Each of the VNICs (114A, 114B, 114C, 114D) is operatively connected to a corresponding virtual network stack (VNS) (116A, 116B, 116C, 116D). In one embodiment of the invention, each VNS (116A, 116B, 116C, 116D) includes functionality to process packets in accordance with various protocols used to send and receive packets (e.g., Transmission Communication Protocol (TCP), Internet Protocol (IP), User Datagram Protocol (UDP), etc.). Further, each VNS (116A, 116B, 116C, 116D) may also include functionality, as needed, to perform additional processing on the incoming and outgoing packets. This additional processing may include, but is not limited to, cryptographic processing, firewall routing, etc.

In one embodiment of the invention, each VNS (116A, 116B, 116C, 116D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the VNSs (116A, 116B, 116C, 116D) is discussed in FIG. 2.

As discussed above, the host (100) includes one or more packet destinations (118). In one embodiment of the invention, the packet destination(s) (118) correspond to any process (or group of processes) executing on the host that is configured to send and/or receive network traffic. Further, the packet destination(s) (118) does not include an internal network stack (i.e., there is no network stack within the packet destination(s)).

Examples of packet destinations (118) include, but are not limited to containers, services (e.g., web server), etc. As shown in FIG. 1, each of the VNSs (116A, 116B, 116C, 116D) is associated with a packet destination (118). In one embodiment of the invention, each packet destination (118) is associated with a single VNS (116A, 116B, 116C, 116D). Alternatively, each packet destination is associated with one or more VNSs (116A, 116B, 116C, 116D).

In one embodiment of the invention, each VNS (116A, 116B, 116C, 116D) is associated with a bandwidth allocation. Those skilled in the art will appreciate that if there is only one VNS (116A, 116B, 116C, 116D) bound to the packet destination (118), then the bandwidth allocation of the VNS (116A, 116B, 116C, 116D) corresponds to the bandwidth allocated to the packet destination (118). In one embodiment of the invention, the bandwidth allocation corresponds to the number of packets the packet destination (118) may receive in a given time interval (e.g., megabytes per seconds). The bandwidth allocation for a given packet destination (118) is enforced by the VNS (116A, 116B, 116C, 116D) operating in polling mode (discussed in FIG. 6).

In one embodiment of the invention, the VNIC (114A, 114B, 114C, 114D) may be bound to a virtual machine (not shown) (e.g., Xen Domain) instead of a packet destination (118). In such cases, the VNIC (114A, 114B, 114C, 114D) is bound to an interface (e.g., a Xen interface), where the interface enables the VNIC (114A, 114B, 114C, 114D) to communicate to with the virtual machine In one embodiment of the invention, the aforementioned virtual machine includes its own network stack and its own operating system (OS) instance, which may be different than the OS executing on the host.

In one embodiment of the invention, each virtual machine is associated with its own MAC address and IP address (which may be static or obtained using Dynamic Host Configuration Protocol (DHCP)). Further, the VNIC associated with the virtual machine includes the same MAC address and IP address as virtual machine with which it is associated.

Figure 2:
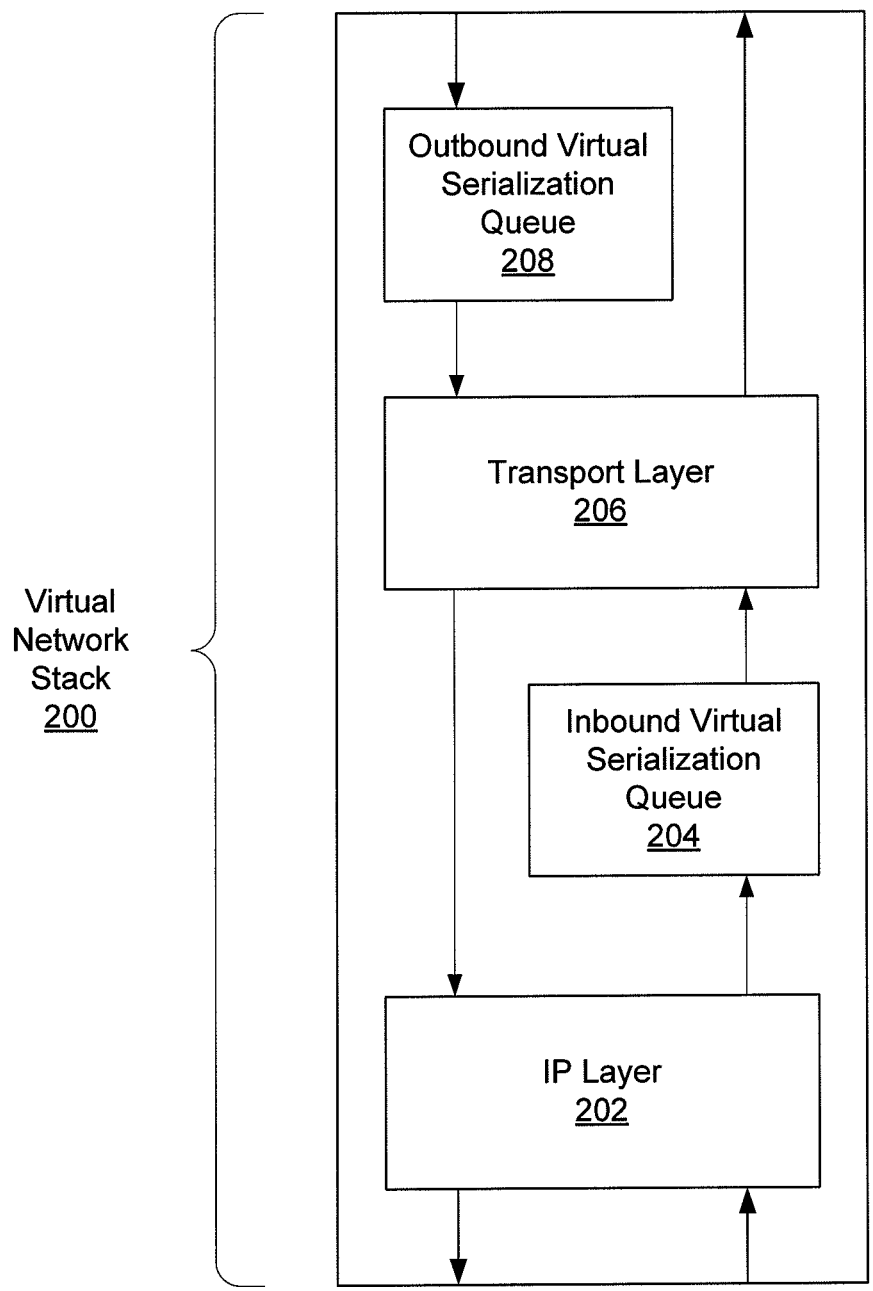
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound serialization queue (208). Each of the aforementioned components is discussed below.

In one embodiment, the IP layer (202) is configured to receive packets from the VNIC associated with the VNS (204) (e.g., VNS D (116D) receives packets from VNIC D (114D) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (e.g., 118) associated with VNS. The inbound VSQ (204) may control the bandwidth by limiting the number of packets in the VSQ (204) and preventing additional packets from entering the VNS (200) until the inbound VSQ (204) has less than a threshold number of packets.

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (e.g., 118) with which the VNS (204) is associated. Further, the outbound VSQ (208) is configured to store packets prior to sending the received packets to the transport layer (206). In one embodiment of the invention, the outbound VSQ (208) is also configured to control the flow of packets from the packet destination (e.g., 118) to the VNS (200). In one embodiment of the invention, the outbound VSQ (208) (or a related process) is configured to block an application from sending packets to the outbound VSQ (208) if the packet destination (e.g., 118) is attempting to issue packets at a higher rate than the outbound bandwidth allocated to the packet destination (e.g., 118). Further, the outbound VSQ (208) (or a related process) is configured to notify the packet destination (e.g., 118) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
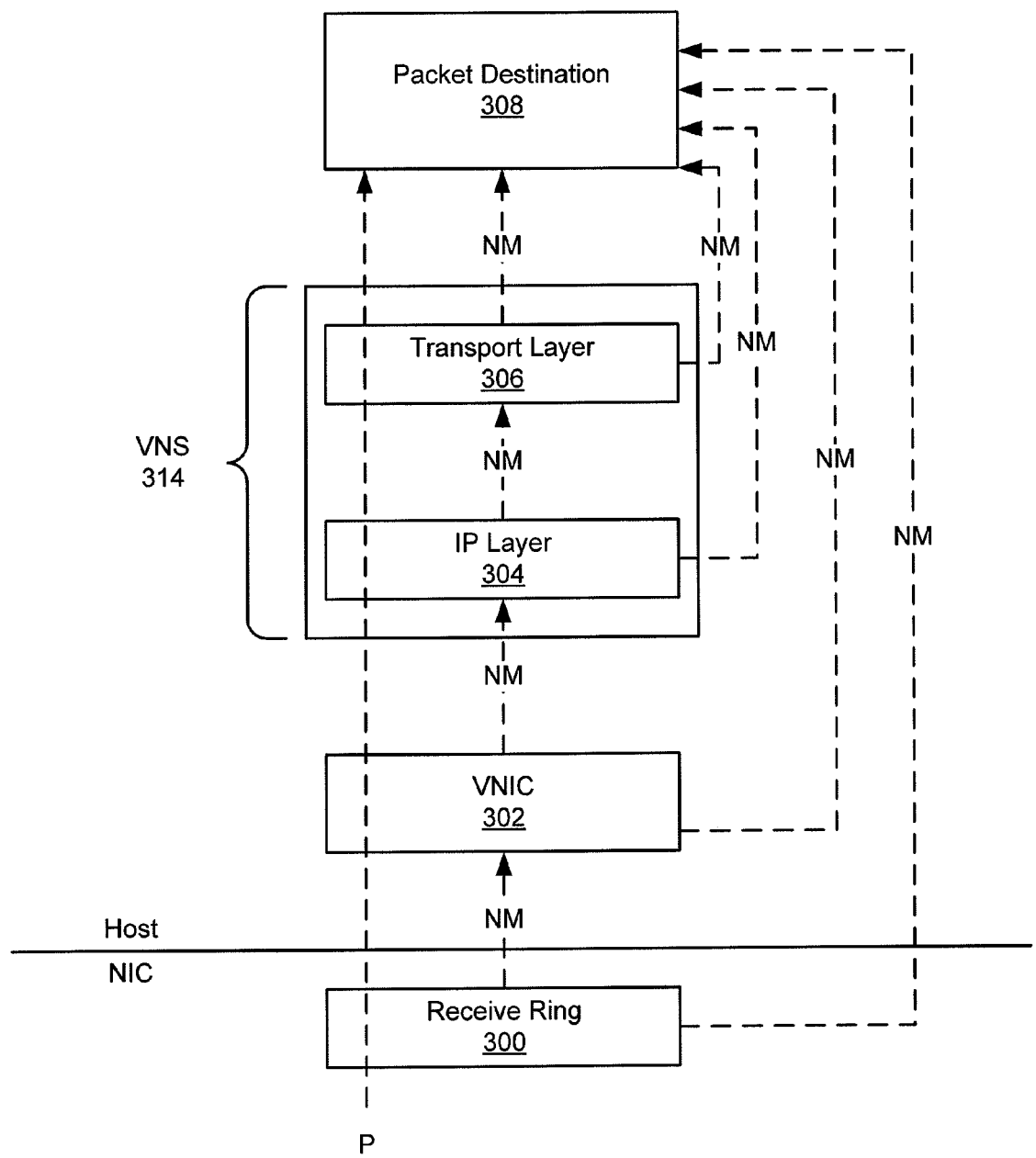
FIG. 3 shows a notification framework in accordance with one embodiment of the invention.

FIG. 3 shows a notification framework in accordance with one embodiment of the invention. As shown in FIG. 3, a packet (P) destined for the packet destination (308) passes through a number of levels (collectively referred to as a networking path). The packet destination for a packet is known at the time the packet enters the networking path as the packet may only enter the networking path if the packet is classified as being associated with the packet destination (e.g., when the destination IP address of the packet corresponds to an IP address associated with the packet destination).

As shown in FIG. 3, the networking path associated with the packet destination (308) includes a receive ring (300), a virtual network interface card (VNIC) (302), an IP layer (304), and a transport layer (306). As shown in FIG. 3, the IP layer (304), and the transport layer (306) are included in the virtual network stack (310).

Though not shown in FIG. 3, each of the aforementioned levels is associated with at least one bidirectional queue (or, alternatively, two unidirectional queues). The bidirectional queues (or unidirectional queues) are typically first-in-first-out (FIFO) queues configured to temporarily store a finite number of packets prior to the packets being processed by corresponding level. For example, the bidirectional queue in the IP layer (304) is configured to store a finite number of inbound packets (i.e., packets received from the VNIC (302)) and outbound packets (i.e., packets received from the Transport Layer (306)) prior to the IP layer (304) processing the packets. In one embodiment of the invention, there is a bidirectional (or two unidirectional queues) for each TCP connection and/or UDP socket currently being used by an application (or applications) in the packet destination (308).

Further, for each direction in the bidirectional queue (or each of the unidirectional queues) there is a drop counter. The drop counter is initially set to zero and is incremented each time a packet is received by the level but is not stored in appropriate queue (i.e., the queue is full). In addition, for each direction in the bidirectional queue (or each of the unidirectional queues) there may also be an error packet counter. The error packet counter is initially set to zero and is incremented each time a packet associated with an error is received by the level. A packet is said to be associated with an error, if there is an error in the header of the packet. The error may include but is not limited to an incorrect or partial MAC address, an incorrect or partial IP address, etc.

As shown in FIG. 3, each level in a networking path associated with the packet destination (308) is configured to send a notification message (NM) to the packet destination (308). The NM may be sent in response to a dropped packet and/or an error packet. As shown in FIG. 3, the NM may be sent as an out-of-band channel (i.e., a different communication path than the incoming packets). In one embodiment of the invention, the out-of-band channel may correspond, but is not limited, to an event port framework, a door call, or a call back function provided during registration of the packet destination with the host. Alternatively, the NM is sent using an in-band channel (i.e., on the same communication path as other incoming packets). For example, the NM would be sent up the networking path through all levels between the level in which the NM was generated and the packet destination (308).

In one embodiment of the invention, the NM may only include a notification that one packet (or a certain number of packets) for the packet destination has been dropped by a specific level. Alternatively, the NM may include additional information about the packet that was dropped. For example, the NM may include information about the connection or socket with which the packet was associated.

While FIG. 3 shows a single packet destination with a single networking path. As shown in FIG. 1, the system may include multiple networking paths and each networking path may include functionality as discussed in FIG. 3. Accordingly, each of the packet destinations in the system may register with the host (312) and receive notification message about dropped packets and/or error packets, where the dropped packets and/or error packets are associated with the packet destination (308).

Figure 4:
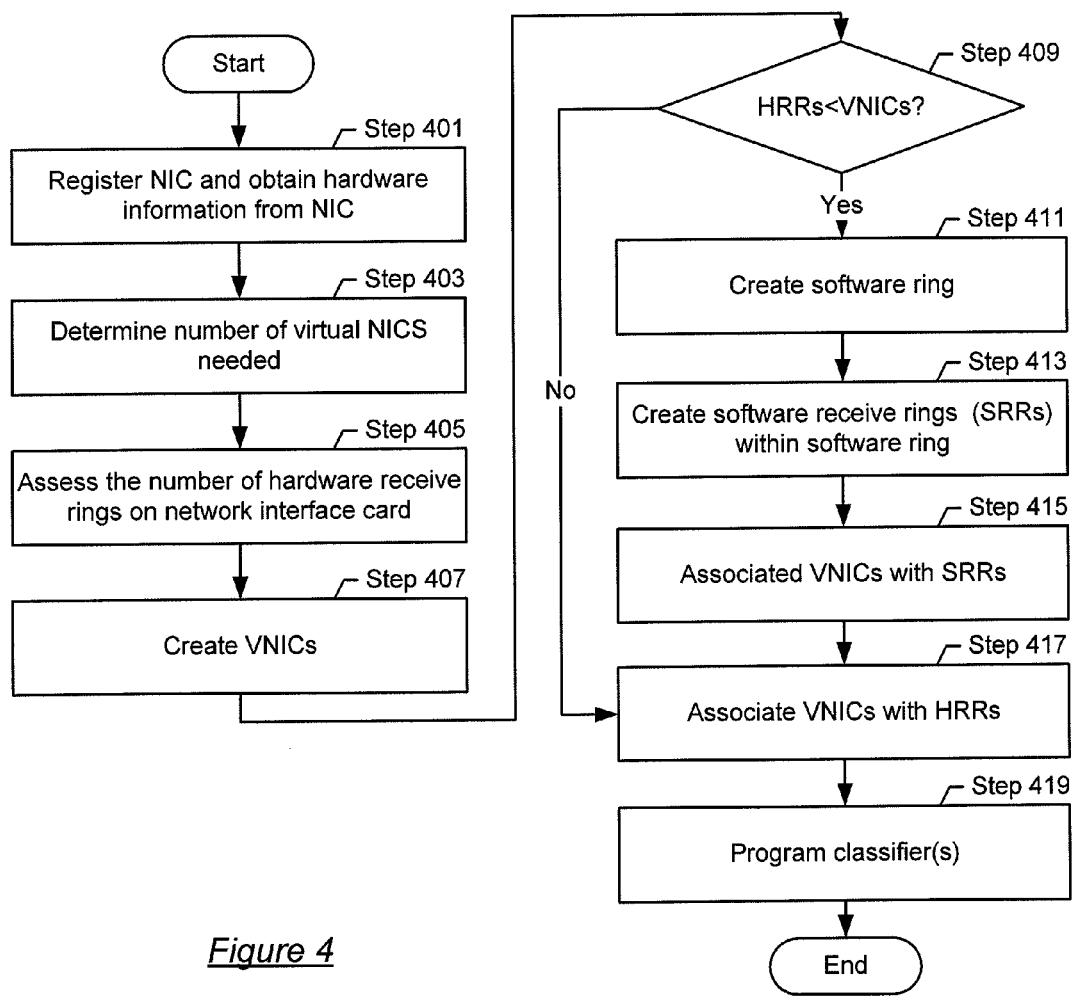
FIGS. 4-7 show flow charts in accordance with one embodiment of the invention.

FIG. 4 shows a flow chart in accordance with one or more embodiments of the invention. More specifically, FIG. 4 shows a method for setting up a system in accordance with one embodiment of the invention. Initially, the NIC is registered and the appropriate device driver is used to obtain hardware information about the network interface card (NIC) (e.g., number of HRRs, APIs to program the hardware classifier, control functions to support interrupt and polling mode, etc.) (Step 401). Once Step 401 is completed, a determination is made regarding the number of VNICs that need to be created on the host (Step 403). In one or more embodiments of the invention, the number of VNICs required corresponds to the number of packet destinations on the host.

Once the number of VNICs to be created has been determined, the number of hardware receive rings on the NIC is assessed (Step 405). VNICs are subsequently created in the host, where the number of VNICs created corresponds to the number of VNICs determined in Step 403 (Step 407). Next, a determination is made about whether there are fewer HRRs than VNICs on the host (Step 409). If there are fewer HRRs than VNICs on the host, then a software ring is created in the host and subsequently associated with one of the HRRs (Step 411).

A set of software receive rings (SRRs) is then created within the software ring (Step 413). The VNICs are then bound to the SRRs (Step 415). More specifically, the VNICs that cannot be bound to the HRRs are bound to the SRRs. Then, the remaining VNICs are bound to the HRRs (Step 417). The hardware classifier (in the NIC) and the software classifier (if host includes a software ring) are programmed (Step 419). In one embodiment of the invention, programming the hardware classifier and software classifier includes specifying to which HRR or SRR to send the received packets. The hardware classifier may be programmed using an API advertised by the device driver (see Step 401. Those skilled in the art will appreciate that steps in FIG. 4 may be a different order.

In one embodiment of the invention, programming the hardware classifier includes specifying that all packets for a specific packet destination are sent to a specific HRR. In one embodiment of the invention, the hardware classifier is programmed using the MAC address and, optionally, the IP address associated with the packet destinations. Thus, all packets with a specific MAC address (and optionally an IP address) are sent to a specific HRR. As discussed, the HRRs are bound to VNICs or software rings. Thus, packets sent to specific HRRs are subsequently sent to the appropriate VNIC or software ring.

In the case where the packets are sent to the software ring, the software classifier in the software ring performs additional classification. In one embodiment of the invention, the software classifier includes the same functionality as the hardware classifier and is programmed using the same criteria (e.g., MAC addresses, IP addresses, etc.) as the hardware classifier.

In one embodiment of the invention, VNICs are preferably bound to an HRR if an HRR is available and the hardware classifier in the NIC is configured to perform the level of classification required by the host. In such cases, one HRR is bound to a software ring and the other HRRs are bound to VNICs. In one embodiment of the invention, each of the aforementioned VNICs is associated with a virtual network stack (VNS), which is in turn associated with a packet destination (see FIG. 1).

As stated above, software rings can be arbitrarily created on top of HRR or SRRs. As a result, different structures involving software rings can be created to handle the same number of VNICs using the method shown in FIG. 4.

Figure 5:
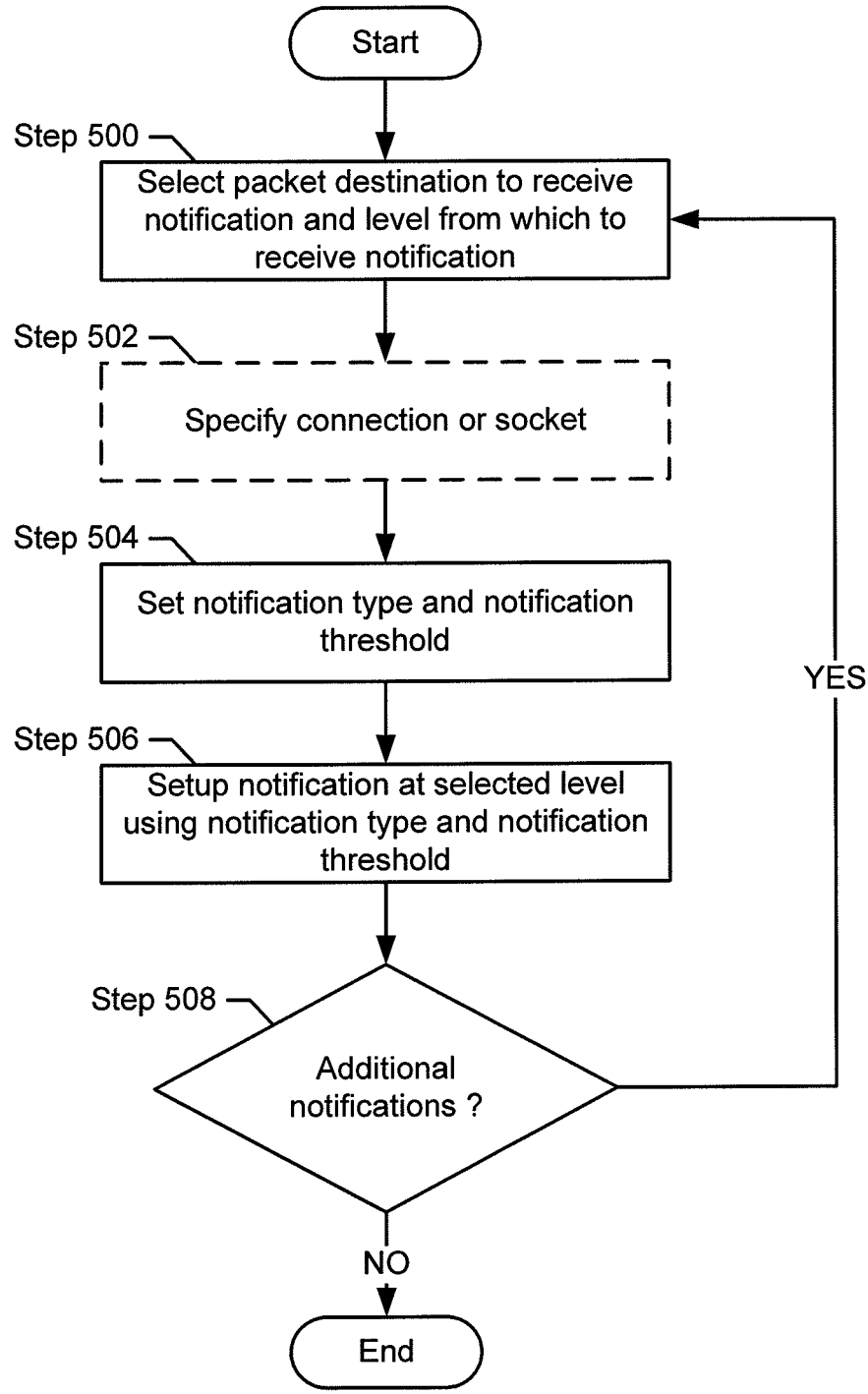

FIG. 5 shows a flowchart in accordance with one embodiment of the invention. More specifically, FIG. 5 shows a flowchart for registering an application to receive a notification message. Initially, the packet destination to receive the notification messages and the level from which to receive the notification message are selected (Step 500). Said another way, the packet destination that is the target of the notification message and the specific level in the networking path (e.g., receive ring, VNIC, IP layer, and TCP layer) from which the notification message is generated is selected. Once the packet destination and level has been selected, a TCP connection or a UDP socket may be optionally selected (Step 502).

Step 502 is typically performed when a given networking path includes packets for multiple TCP connections and/or UDP sockets and the packet destination (or application executing therein) only wants to receive notification messages related to the specific TCP connection or UDP socket. Thus, instead of receiving notification messages when any packet drops, the packet destination (or application therein) only receives notification messages that packets associated with the selected TCP connection or UDP socket have been dropped. If the networking path only receives packets associated with a single TCP connection or UDP socket, or if the packet destination (or application therein) does not require per-TCP connection or per-UDP socket granularity, then Step 502 may not be performed.

The notification type and the notification threshold are subsequently set (Step 504). In one embodiment of the invention, the notification type corresponds to dropped packet notification or error packet notification. Drop packet notification corresponds to notifying the packet destination that a packet has dropped. Similarly, error packet notification corresponds to notifying the packet destination that there is an error packet.

In one embodiment of the invention, the notification threshold corresponds to a minimum number of packets that must be dropped (as recorded by the drop counter) or a minimum number of error packets that must be received (as recorded by the error packet counter) before a notification message is sent to the packet destination. For example, the notification threshold may be set to ten, accordingly, a notification message is sent every time ten packets have been dropped. Typically, once the notification message is sent the corresponding counter (drop or error packet) is reset to zero.

The notification is subsequently registered with the host using the information specified in Steps 500-504 (Step 506). At this stage, the notification has been set and the packet destination (i.e., the packet destination specified in Step 500) may receive notification messages from the level specified in Step 500. A determination is then made about whether additional notifications need to be registered in the host (Step 508). If additional notifications need to be registered, then the process proceeds to Step 500. Alternatively, the process ends. The process in FIG. 5 may be repeated for each packet destination on the host as well as for both dropped packets and error packets.

Figure 6:
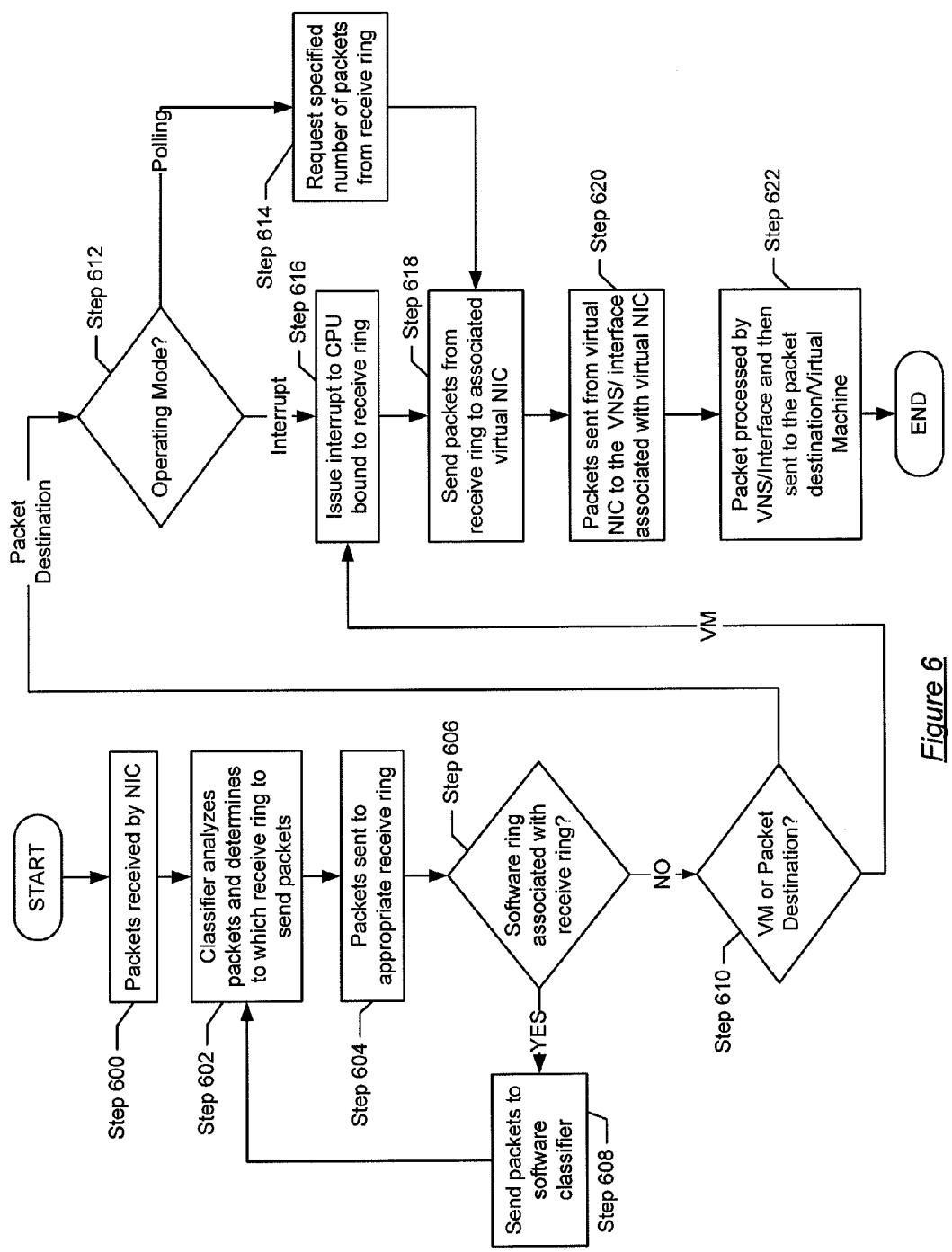

FIG. 6 shows a flow chart in accordance with one or more embodiments of the invention. More specifically, FIG. 6 shows a method for processing received packets in accordance with one embodiment of the invention. Initially, packets are received by a NIC (Step 600). Next, a hardware classifier associated with the NIC determines to which receive ring (e.g., HRR) to send the packets (Step 602). The packets are then sent to the appropriate receive ring (Step 604) based on the classifier's assessment.

Continuing with the discussion in FIG. 6, a determination is then made about whether the receive ring is associated with a software receive ring (Step 606). If the receive ring is associated with a software receive ring, then the packets are forwarded to a software classifier (Step 608). If Step 602 is entered from Step 608, then classifier in Step 602 now corresponds to a software classifier and all references to receive rings in Steps 602-622 correspond to SRRs. Said another way, when Steps 602-606 are initially performed, the classifier corresponds a hardware classifier and the receive rings correspond to HRRs. However, if the HRR is bound to a software ring (see Step 606), then in all subsequent executions of Steps 602-622, the classifier corresponds to a software classifier and all references to receive rings in Steps 602-622 correspond to SRRs.

If the receive ring is not associated with a software ring, then a determination is made about whether the receive ring (HRR or SRR) is associated with a virtual machine or a packet destination (Step 610). The receive ring is associated with the virtual machine if the receive ring sends (via a VNIC) received packets to an interface, which in turn sends packets to a virtual machine Similarly, the receive ring is associated with a packet destination if the receive ring (via a VNIC) sends packets to a VNS, which in turn sends packets to a packet destination.

If the receive ring is associated with a packet destination, the process proceeds to Step 612. Alternatively, if the receive ring is associated with a virtual machine, then the process proceeds to Step 616. With respect to Step 612, a determination is made about whether the VSQ associated with the VNS is operating in polling mode or interrupt mode.

Continuing with the discussion of FIG. 6, if the VSQ is operating in polling mode, then the packets remain in the receive ring (HRR or SRR) until the VSQ requests a specified number of packets from the receive ring (Step 614). In one embodiment of the invention, the VSQ does not request any packets when there are packets already queued on the VSQ. In one or more embodiments of the invention, the VSQ retrieves all packets from the receive ring when a request is made for packets.

Those skilled in the art will appreciate that the receive rings store a finite number of packets. Thus, if the receive rings receive packets at a faster rate than the rate at which the corresponding VSQ requests the packets, the receive rings will eventually fill completely with packets and packets received after this point are dropped until packets on the receive rings are requested and processed. As discussed above, if the packet destination has registered with the host to receive notification regarding dropped packets, then notification messages are sent to the packet destination (see FIG. 7). In one embodiment of the invention, the rate at which packets are requested from the receive ring (SRR or HRR) and the number of packets requested is determined by the bandwidth allocation of the VNS bound to the receive ring.

Alternatively, if the VSQ is operating in interrupt mode, then an interrupt is issued to a processor (i.e., a processor bound to the VSQ that is bound to the VNS associated with the receive ring or the processor bound to the interface associated with the VM) (Step 616). In one embodiment of the invention, if the receive ring is an SRR and it is bound to a VNIC, then the interrupt (as recited in Step 616) is a software interrupt as opposed to a hardware interrupt (as recited in Step 616), which is generated when the HRR is bound to a VNIC. The packets are then sent to the VNIC (Step 618).

In one embodiment of the invention, if the VSQ is operating polling mode, then the VSQ, which includes a copy of the appropriate acceptor function, uses the acceptor function to obtain the packet from the receive ring and place it in the appropriate VNIC. Alternatively, if the VSQ is operating in interrupt mode, then the device driver (or NIC) executes the acceptor function to send the packet from the receive ring to the appropriate VNIC.

The VNIC subsequently sends the packets to the appropriate VNS or interface (Step 620), where the packets are processed and then sent to the packet destination or virtual machine (Step 622).

Figure 7:
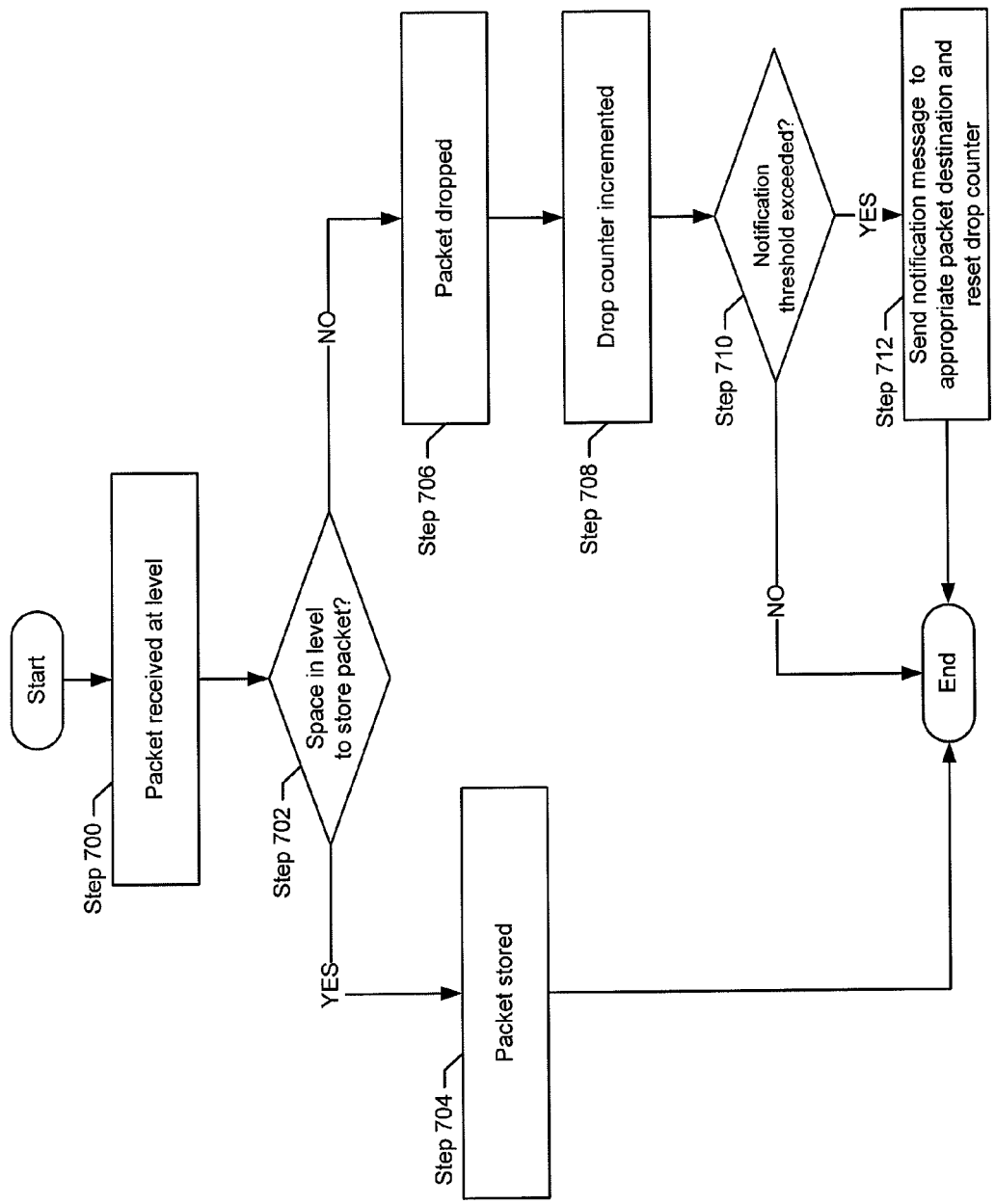

FIG. 7 shows a flow chart in accordance with one or more embodiments of the invention. More specifically, FIG. 7 shows a method for notifying a packet destination that is registered to receive notification that a packet has been dropped. Note the packet that is dropped is associated with the packet destination (e.g., when the destination IP address of the packet corresponds to an IP address associated with the packet destination). Further, the method shown in FIG. 7 occurs each time a packet is received by a level in the networking path associated with the packet destination. In addition, the method shown in FIG. 7 may be performed concurrently at each level in the networking path associated with the packet destination. Moreover, the method shown in FIG. 7 may be performed concurrently in multiple networking paths within the host.

Turning to the FIG. 7, initially, a packet is received at a level (e.g., receive ring, VNIC, IP layer, transport layer) (Step 700). A determination is then made about whether there is space in the appropriate queue (bidirectional or unidirectional) to store the packet (Step 702). If there is space in the appropriate queue, then the packet is stored in the appropriate queue (Step 704) and the method ends.

Alternatively, if there is no space in the appropriate queue, then the packet is dropped (Step 706) (i.e., not stored in the queue and, thus, not processed any further by the host). The drop counter is subsequently incremented (Step 708). A determination is then made about whether the notification threshold is been exceeded (Step 710). The aforementioned determination is made using the drop counter incremented in Step 708. If the notification threshold is exceeded, then a notification message is sent to the packet destination (i.e., the packet destination with which the packet is associated) (Step 712). Alternatively, if the notification threshold is not exceeded, then the process ends and no notification message is sent.

In one embodiment of the invention, if the packet destination is associated with multiple TCP connections or UDP sockets and the packet destination has only registered to receive packets associated with a specific connection then one of the two following embodiments may be implemented: (i) the hardware classifier is configured to only forward packets associated with the specific TCP connection or UDP socket to a receive ring, where the receive ring is in the networking path associated with the packet destination. In this case, no additional processing is required when sending the notification message. or (ii) the hardware classifier forwards all packets for the packet destination to a single receive ring. In this scenario, if there are multiple TCP connections or UDP sockets associated with the packet destination, then a separate drop counter is maintained for each TCP connection or UDP socket and step 710 is modified to determine whether the drop counter associated with the specific TCP connection or UDP socket has exceeded the threshold.

A method similar to the method shown in FIG. 7 may be used to send notification messages corresponding to error notification messages to the packet destination. In such cases, step 702 is modified to determine whether the packet is an error packet and step 708 is modified to increment the error packet counter.

Embodiments of the invention enable a packet destination (or an application executing therein) to register and receive notifications of dropped packets at all levels within the associated networking path (i.e., the networking path associated with the packet destination). Further, embodiments of the invention allow the packet destination (or an application executing therein) to specify the specific UDP socket or TCP connection about which to receive notifications (i.e., when packets associated with the specific UDP socket or TCP connection are dropped).

In addition to providing the packet destination (or an application executing therein) immediate notification of dropped packets, embodiments of the invention also enable the packet destination (or an application executing therein) to take action in response to receiving notification of dropped packets (or error packets).

For example, if a packet destination (or an application executing therein) receives notification of dropped packets, the packet destination (or an application executing therein) may re-route packets in the network on which the host is located or, alternatively, change the encoding of data or video streams to reduce the number of packets being sent to the packet destination (or an application executing therein).

Finally, embodiments of the invention enable the system administrators to identify when and where packets are being dropped. Using the aforementioned information, the system administrators may be able to more effectively and efficiently allocate host networking resources (e.g., queue sizes, processor cycle allocation to processes inbound and outbound packets, etc.).

Figure 8:
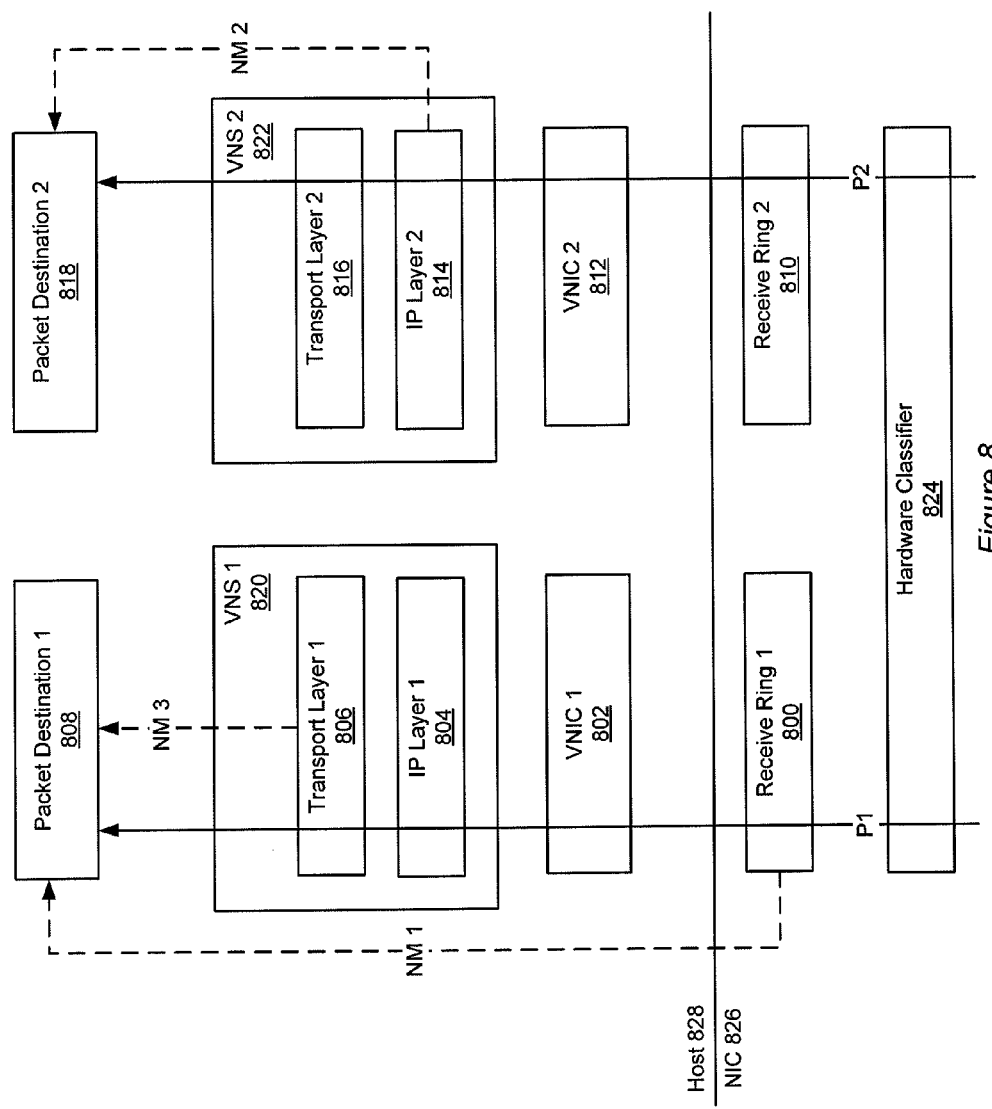
FIG. 8 shows an example in accordance with one embodiment of the invention.

FIG. 8 shows an example in accordance with one embodiment of the invention. The example is not intended to limit the scope of the invention. Turning to FIG. 8, the system includes a NIC (826) operatively connected to a host (828). The NIC (826) includes two receive rings (800, 810) and a hardware classifier (824). The hardware classifier (824) is configured to forward packets (P1) for packet destination 1 (808) to receive ring 1 (800) and to forward packets for packet destination 2 (818) to receive ring 2 (818).

As shown in FIG. 1, packets (P1) for packet destination 1 (808), once sent to receive ring 1 (800), pass through VNIC 1 (802), IP layer 1 (804) and transport layer 1 (806) and eventually reach packet destination 1 (808). As shown in FIG. 8, IP layer 1 (804) and transport layer 1 (806) are included in VNS 1 (820). Similarly, packets (P2) for packet destination 2 (818), once sent to receive ring 2 (810), pass through VNIC 2 (812), IP layer 2 (814) and transport layer 2 (816) and eventually reach packet destination 2 (818). As shown in FIG. 8, IP layer 2 (814) and transport layer 2 (816) are included in VNS 2 (822).

Receive ring 1 (800), VNIC 1 (802), IP layer 1 (804) and transport layer 1 (806) are collectively referred to as the networking path associated with packet destination 1 (808). Receive ring 2 (810), VNIC 2 (812), IP layer 2 (814) and transport layer 2 (816) are collectively referred to as the networking path associated with packet destination 2 (818).

As shown in FIG. 8, packet destination 1 (808) has registered to receive a notification message (NM 1) when receive ring 1 (800) drops a packet. NM 1 (as shown in FIG. 8) is communicated to packet destination 1 using an out-of-band communication channel. Packet destination 1 (808) has also registered to receive a notification message (NM 3) if a certain number of error packets are received by transport layer 1 (806). NM 3 is communicated using an in-band communication channel. Finally, packet destination 2 (818) has registered to receive a notification message (NM 2) if packets are dropped by IP layer 2 (814). NM 2, like NM 1, is communicated to packet destination 2 (818) using an out-of-band communication channel.

In one embodiment of the invention, each of the levels in the networking path is additionally configured to perform the following: (i) receive a packet; (ii) determine whether the level above the current level (e.g., a receive ring (300 in FIG. 3) may query the VNIC (302 in FIG. 3) to determine whether the VNIC includes space to store the packet; (iii) if the packet can be stored in the next level (i.e., the next level has space to store the packet), then the packet is sent to the next level; and (iv) if the next level cannot store the packet (i.e., the next level has no space to store the packet), then the packet is dropped and either the current level or the next level update the appropriate drop counters and then determine whether to issue a notification message to the packet destination in accordance with embodiments of the invention discussed above.

Figure 9:
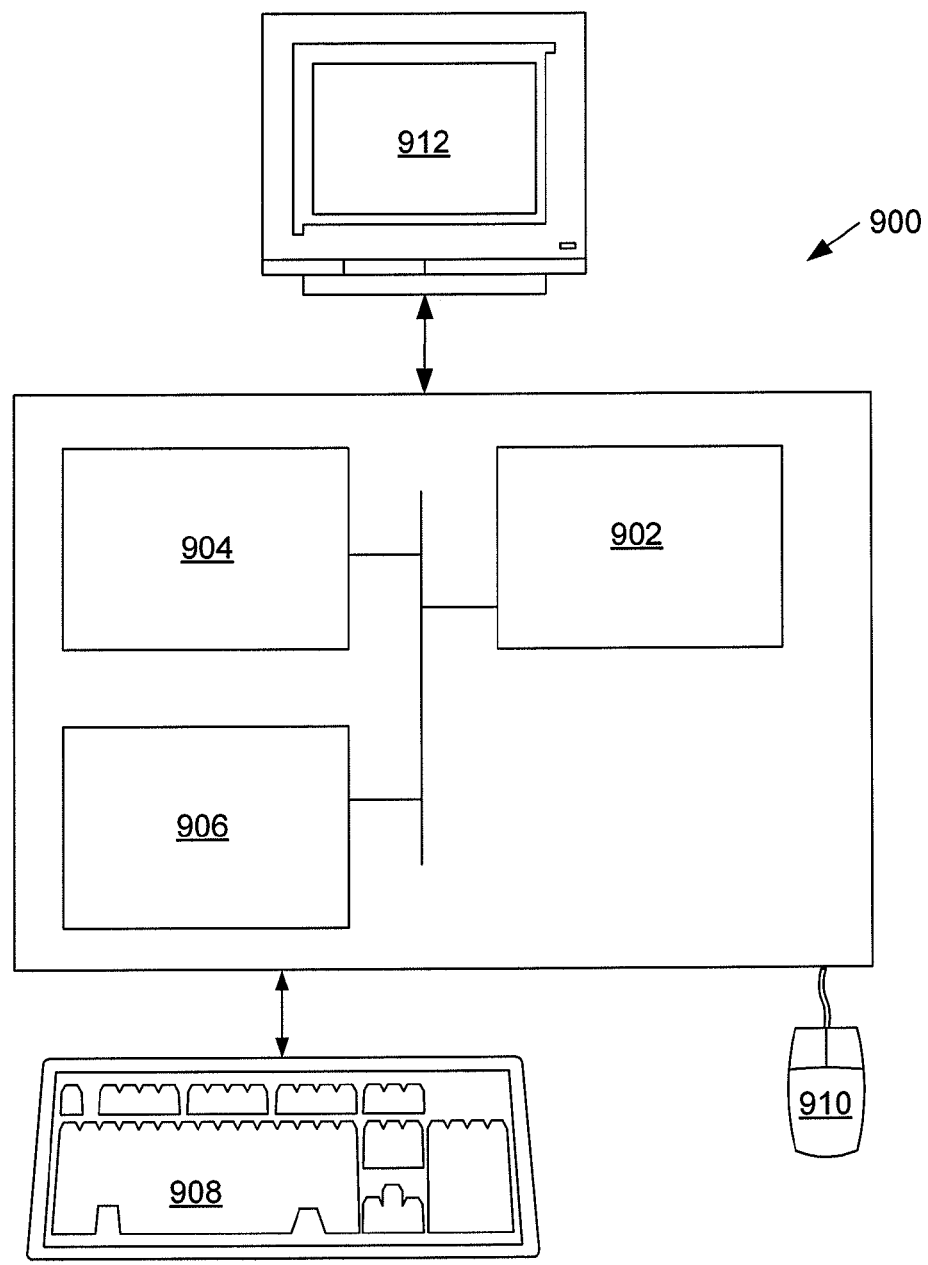
FIG. 9 shows a computer system in accordance with one embodiment of the invention.

An embodiment of the invention may be implemented on virtually any type of computer regardless of the platform being used. For example, as shown in FIG. 9, a networked computer system (900) includes a processor (902), associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network via a network interface connection (not shown). Those skilled in the art will appreciate that these input and output means may take other forms. Further, those skilled in the art will appreciate that one or more elements of the aforementioned computer (900) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for notifying a packet destination of a plurality of packet destinations on a host, comprising:
receiving, by a network interface card (NIC) operatively connected to the host, a packet addressed to the packet destination of the plurality of packet destinations on the host, wherein a virtual network interface card (VNIC) on the host is bound to the packet destination;
classifying the packet by the NIC;
forwarding, by the NIC, the packet to one of a plurality of receive rings on the NIC, wherein the one of the plurality of receive rings is bound to the VNIC on the host;
if the NIC determines that the one of the plurality of receive rings does not comprise space to store the packet:
dropping the packet by the one of the plurality of receive rings,
incrementing a drop counter associated with the one of the plurality of receive rings, and
sending, by the NIC in response to the counter exceeding a first predefined notification threshold, a first notification message from the NIC to the packet destination, wherein the first notification message indicates that the packet was dropped by the one of the plurality of receive rings;
if the NIC determines that the one of the plurality of receive rings comprises space to store the packet:
forwarding the packet to the VNIC,
dropping the packet by the VNIC in response to determining that the VNIC does not comprise space to store the packet, and
sending, by the VNIC in response to the dropping, a second notification message from the VNIC to the packet destination, wherein the second notification message indicates that the packet was dropped by the VNIC.

2. The method of claim 1, further comprising:
prior to sending the first notification message to the packet destination:
registering the packet destination to receive the first notification message from the NIC, when the one of the plurality of receive rings drops the packet.

3. The method of claim 1, further comprising:
resetting the drop counter associated with the one of the plurality of receive rings after the first notification message is sent to the packet destination.

4. The method of claim 1, wherein the first predefined notification threshold is a numeric value corresponding to a plurality of dropped packets.

5. The method of claim 1, wherein the packet is a user datagram protocol (UDP) packet.

6. The method of claim 1, wherein the VNIC is configured to store a specified number of packets.

7. The method of claim 1, wherein dropping the packet by the VNIC comprises incrementing a drop counter associated with the VNIC.

8. The method of claim 7, further comprising:
resetting the drop counter associated with the VNIC after the second notification message is sent to the packet destination on the host.

9. The method of claim 7, wherein the packet destination is only notified if the drop counter associated with the VNIC exceeds a second predefined notification threshold.

10. The method of claim 9, wherein the second predefined notification threshold is a numeric value corresponding to a plurality of dropped packets.

11. The method of claim 1, wherein sending the first notification message from the NIC to the packet destination on the host comprises using an out-of-band communication channel between the NIC and the packet destination on the host.

12. The method of claim 11, wherein the out-of-band communication channel is a different communication path than a path used by incoming packets.

13. The method of claim 1, wherein sending the second notification message from the VNIC to the packet destination on the host comprises using an out-of-band communication channel between the VNIC and the packet destination on the host.

14. The method of claim 13, wherein the out-of-band communication channel is a different communication path than a path used by incoming packets.

* * * * *